(12) United States Patent
Endras et al.

(10) Patent No.: US 10,089,396 B2
(45) Date of Patent: Oct. 2, 2018

(54) SYSTEM AND METHOD OF A DYNAMIC INTERFACE FOR CAPTURING VEHICLE DATA

(71) Applicant: NthGen Software Inc., Toronto, Ontario (CA)

(72) Inventors: Mark Endras, Toronto (CA); Hon-Wai Chia, Toronto (CA)

(73) Assignee: NthGen Software Inc., Toronto, Ontario (CA)

( * ) Notice: Subject to any disclaimer, the term of this patent is extended or adjusted under 35 U.S.C. 154(b) by 373 days.

(21) Appl. No.: 14/813,870

(22) Filed: Jul. 30, 2015

(65) Prior Publication Data

US 2016/0034590 A1 Feb. 4, 2016

Related U.S. Application Data

(60) Provisional application No. 62/030,691, filed on Jul. 30, 2014.

(51) Int. Cl.
*G06F 17/30* (2006.01)
*G06F 17/24* (2006.01)
*G06Q 30/02* (2012.01)

(52) U.S. Cl.
CPC ...... *G06F 17/30867* (2013.01); *G06F 17/243* (2013.01); *G06Q 30/0278* (2013.01)

(58) Field of Classification Search
CPC .... G06Q 30/00; G06Q 30/08; G06Q 30/0278; G06Q 17/243; G06F 17/30867
See application file for complete search history.

(56) References Cited

U.S. PATENT DOCUMENTS

| 8,712,893 B1* | 4/2014 | Brandmaier | G06Q 40/08 705/35 |
| 2003/0036964 A1* | 2/2003 | Boyden | G06Q 30/0609 705/26.3 |
| 2012/0239530 A1* | 9/2012 | Varadarajan | G06Q 30/0601 705/26.41 |

(Continued)

FOREIGN PATENT DOCUMENTS

CN 1967565 A * 5/2007

OTHER PUBLICATIONS

Koch, Forms, usability, and the W3C DOM, May 30, 2003, 8 pages.*

(Continued)

*Primary Examiner* — Albert M Phillips, III
(74) *Attorney, Agent, or Firm* — Lempia Summerfield Katz LLC

(57) ABSTRACT

A mobile device application is provided with a dynamic interface for capturing vehicle data. Using a captured VIN number, decoded particulars of the vehicle can be retrieved, together with other particulars from third party databases. Fields of a data capture form are pre-populated with this retrieved data as well as user input in text and multimedia formats. The unfilled fields are presented to the user through an interface in a staged format, showing only relevant unfilled fields. This is reconfigured dynamically (to show more or less fields) as the data is entered/retrieved. The application may use distinct text entry and multimedia entry modes, which may be guided (e.g. with visual cues for photo/video capture). A related method is also provided.

23 Claims, 9 Drawing Sheets

(56) References Cited

U.S. PATENT DOCUMENTS

| | | | | |
|---|---|---|---|---|
| 2014/0104379 A1* | 4/2014 | Glasgow | ................ | H04N 5/232 348/42 |
| 2015/0025993 A1* | 1/2015 | Kiglies | .............. | G06Q 30/0278 705/26.3 |
| 2015/0264255 A1* | 9/2015 | Budihal | ............. | H04N 5/23222 348/170 |
| 2016/0012539 A1* | 1/2016 | Gorelov | ............. | G06Q 30/0278 705/4 |

OTHER PUBLICATIONS

VINtrack EZ OBD Full VIN Upgrade (Item #EZOBD), Jan. 12, 2012, 3 pages.*

Tripathi, Getting a input field populated on entering the value in one Input field, 2009, 3 pages.*

Tom92909, How do you make a Dynamic Form auto populate fields?, 2009, 3 pages.* eBay Motors—How to Sell a Vehicle—Take Photographs, Jan. 19, 2009, 3 pages.*

\* cited by examiner

SYSTEM AND METHOD OF A DYNAMIC INTERFACE FOR CAPTURING VEHICLE DATA

CROSS-REFERENCE TO RELATED APPLICATIONS

This application claims the benefit of U.S. Provisional Patent Application No. 62/030,691 filed Jul. 30, 2014, the contents of which is hereby incorporated in its entirety.

FIELD OF THE INVENTION

The invention relates to assisted methods for capturing vehicle data.

BACKGROUND

Historically barter, haggling, sale by a set-price and auctions have been some of the traditional ways to negotiate the exchange of goods and commodities. An issue with vehicle resale is that there are no standardized ways to capture vehicle data. Similarly when a user wants an accurate appraisal of the vehicle if information about the vehicle is missing or misrepresented, an accurate appraisal has not been possible.

An appraisal is an estimate of an item's worth, usually performed by an expert and may be used as a mechanism to define the asking price for an item. Many factors influence the assessment of a vehicle and it is subjective.

Online auctions for vehicles are common where a wide variety of off-lease, commercial and dealer vehicles may be sold to other dealers and the public. Some dealers may auction one or more vehicles to other dealers who in turn sell these to the public via their showrooms.

An auction is a process of buying and selling goods or services by offering them up for bid, taking bids, and then selling the item to the highest bidder. Bidding is the act of participating in an auction by offering to purchase an item for sale. Prices are bid by buyers and asked (or offered) by sellers. Auctions are publicly and privately seen in several contexts and almost anything can be sold at an auction. E-Bidding or Electronic Bidding—is a type of auction, whereby a person may make a bid without being physically present at an auction or where the entire auction is taking place on the Internet.

Auctions are prone to collusion and manipulation if the bidders are not fully aware of the value of the item being auctioned. The vehicle may be remote, where only digital representation e.g. photos and videos of it being available. Thus it is easy to hide any blemishes or other kind of damage. For example if a vehicle has been wrecked and repaired, it has lost a certain value, but if the bidders are not aware of the history of the vehicle they may end up overpaying for it.

When consumers want to sell their vehicles online they typically have to create their own ads. Since each consumer may possibly take a different number of photos and photos may be taken from different angles each ad becomes different. Additionally consumers can often forget, or choose to purposely ignore the areas that they want to hide e.g. accident damage. For the buyer then it is difficult to compare similar vehicles as each ad may have different or incomplete or misleading information in it. Similarly when a user wants an accurate appraisal of their vehicle it is important that all relevant data about the vehicle be captured so that appraisers are provided a full disclosure and can provide an accurate appraisal.

It would be desirable to have a system that enables such data to be captured in a reliable, complete and standardized way.

SUMMARY

Broadly speaking, the present invention relates to a system and method of a dynamic interface for capturing vehicle data. The vehicle data capture requirements are based on the information that is derived from the decoding of the VIN and also information gathered from third parties and the user input. Such vehicle data capture may preferably be used in vehicle resale, auctions and appraisals. The system may run on a server that is accessible to users preferably via connected mobile devices.

The automated method and system assists a user in gathering accurate and representative data about a vehicle. Such information includes but is not limited to photos, videos, audio, text information and the like based on the information that is deciphered when a vehicle VIN is decoded, the vehicle mileage and any damage that it may have sustained due to accidents. Thus based on the VIN and the make, model, year and other information the user is systematically guided to gather photos, videos, audio, text information about the vehicle. In one embodiment the number of photos or videos for example may vary based on e.g. the make, model, year, type of vehicle and its mileage.

In one embodiment the VIN of a vehicle may be used to acquire further detailed information about the vehicle from different third parties. Such information may include but is not limited to vehicle history, ownership and registration, service history, installed options etc.

In one embodiment there may be an application either generic or purpose built, using which a user may interact with the functionality provided by the system. The application may be specific for a particular mobile device e.g. an iPhone or a Google Android phone, or a tablet computer etc. or generic e.g. Flash or HTML5 based app that can be used in a browser.

In one embodiment users may use connected devices e.g. a Smartphone, a tablet, or a personal computer to connect with the system e.g. using a browser on a personal computer to access the website or via an app on a mobile device. In one embodiment the app may be downloaded from an AppStore. Devices where invention can be advantageously used may include but not limited to an iPhone, iPad. Smartphones. Android phones, personal computers e.g. laptops, tablet computers, touch-screen computers running any number of different operating systems e.g. MS Windows, Apple iOS, Linux, Ubuntu, etc.

In a preferred embodiment, a graphical user interface is provided using which a user may be guided/cued for taking photos, videos, audio and text information etc. based on the vehicle VIN number, make, model, year, mileage, vehicle type etc.

In one embodiment the information that is contained in the VIN is decoded. The VIN may be decoded using third party services. This information may be used to get further information about the vehicle from third parties. Some information about a vehicle may not be available from the VIN, e.g. color, engine size, installed options may not be available. Such information may be obtained from third parties by querying their databases by supplying the VIN and getting this information.

In the preferred embodiment the user launches app. Preferably the users may connect to the system using a connected device e.g. a Smartphone, a tablet, or a personal computer where the app executes. In one embodiment the app may be downloaded from an AppStore.

In one embodiment the user scans the VIN of the vehicle using the connected device. In one embodiment the VIN may be acquired by performing a VIN scan using a mechanised method to automatically machine read the VIN from the vehicle. In one embodiment a VIN may be optically read with barcode scanners or digital cameras, or digitally read via OBD-II (On Board Diagnostics) available in some vehicles. In one embodiment there may be a Smartphone based app that can capture the VIN from a vehicle and transmit it to the server for processing (decoding and gathering information from third parties). In another embodiment the VIN may be inputted into the app by the user by physically reading it from the vehicle; the user input may be text or voice.

Preferably, the app interface and data capture requirements are adapted based on information extracted from VIN and information gathered from third parties using VIN. In one embodiment the app interface and data capture requirements change to match the information gathered from the VIN. For example if the VIN reveals that the vehicle is a 4-door sedan then the user is asked to take 4 photos and 1 video but if the VIN reveals that the vehicle is a 2-door convertible then the user is asked to take photos 8 photos and 3 videos.

The user may be cued or guided through the interface for taking photos and videos of the vehicle. Preferably, as more data is captured the app interface and data capture requirements are continuously adapted to adjust to this information and provide the user with the cues that are in accordance to this information. Thus if a user states the vehicle has 2 sets of tires e.g. one set is all season tires while the other set is winter tires, the app may instruct the user to take photos of each set of tires.

According to a first aspect of the invention, a mobile device is provided having a programmed application. The capturing, by means of a camera on the device. A vehicle identification number related to a vehicle is captured by means of a camera on the device. From this, decoded particulars of the vehicle are retrieved from a query of the vehicle identification number in at least one database. Other vehicle particulars are also received from a query of the captured vehicle identification number in other third party databases. A form is provided having a set of fields for entry of vehicle data. At least certain fields are pre-populated from the decoded particulars and the other particulars. A graphical user interface is generated on a display of the device that presents the form to a user in a staged format. User input is received on the device for at least certain fields not already pre-populated. The fields include both text and multimedia fields. As fields are pre-populated or input, the staged format of the unfilled fields is reconfigured. This includes determining whether certain unfilled fields are relevant to the vehicle based on the fields pre-populated or input so far. Only relevant unfilled fields are presented to the user for completion.

According to a second aspect of the invention, a method is provided. A vehicle identification number related to a vehicle is captured at a computer. Decoded particulars of the vehicle are retrieved from a query of the vehicle identification number in at least one database. Other vehicle particulars of the vehicle may also be captured from other sources. A form is provided having a set of fields for entry of vehicle data. At least certain fields are pre-populated from the decoded particulars and the other particulars. A graphical user interface is generated on the computer that presents the form to a user, in a text entry mode, in a staged format. User input is received on the computer for at least certain fields not already pre-populated. As fields are pre-populated or input, the staged format of the unfilled fields is reconfigured by the computer. This includes determining whether certain unfilled fields are relevant to the vehicle based on the fields pre-populated or input so far. Only relevant unfilled fields are presented to the user for completion. Toggling is permitted between the text entry mode and a multimedia entry mode for capturing, at the computer, multimedia data with respect to the vehicle. The multimedia entry mode has capture slots for specific vehicle multimedia data. The number and type of slots is automatically reconfigured, at the computer, as fields are pre-populated or input in the text entry mode.

The vehicle identification number may be captured using a variety of methods, including a barcode scanner, on board diagnostics, or user input. In one preferred embodiment, a camera on a mobile device may be used to capture the VIN.

The other vehicle particulars may include particulars related to at least one of history, ownership, registration, service or maintenance history, accident data, and installed options.

The other sources may include third party databases, in which case, the other particulars are received by querying the vehicle identification number or at least one of the decoded particulars in said third party databases.

The other sources may also include on board diagnostics, in which case, the other particulars are retrieved or scanned from the vehicle.

Preferably, the multimedia entry mode permits capturing data in photo, video or audio formats.

The user input may also include user input converted to text from voice or image formats.

Preferably, the multimedia entry mode includes user guidance for capturing photo, video or audio for each given slot.

This may include displaying arrows or other graphical signifiers to the user to align a camera shot for photo or video capture.

This may also include displaying a graphical outline of at least a portion of a vehicle to the user to align a camera shot for photo or video capture. In some embodiments, the outline may approximate the outline of the vehicle based on the decoded particulars.

At least one of the fields may be a user-defined field.

In some embodiments, the progress of the fields presented to the user may be halted if a relevant field remains unfilled.

In other embodiments, the user may be allowed to skip fields are return to them later for completion. The form with unfilled fields may be able to be saved for completion at a later time.

Although data is retrieved from decoded particulars and other sources, in certain embodiments, the user may be permitted to verify the pre-populated fields (or provide explanatory comments).

Following completion, the system may certify that all of the relevant fields have been input or pre-populated in the text entry mode (and/or that all of the relevant slots have been captured in the multimedia entry mode). This certification may be used as a checkpoint prior to some other action. For example, the vehicle may only be permitted to be advertised for sale (e.g. auction) once the form has been certified.

The captured multimedia data may be automatically analysed. This may lead to an additional field being presented to the user to be completed following the analysis (e.g. particulars of some exterior damage or rust seen on the captured images), or additional data may be queried from outside sources (e.g. accident, maintenance or service history). This may also trigger an additional multimedia slot to be created for the user to provide further multimedia data following the analysis (e.g. ask the user to take close-up pictures or video of an area of damage, or a modified part).

In one embodiment, all capturing and inputting steps are done using onboard capabilities of the computer. The computer may, for example, be a mobile device. For example, multimedia capture may be done using a camera on the device.

DETAILED DESCRIPTION

Figure 1:
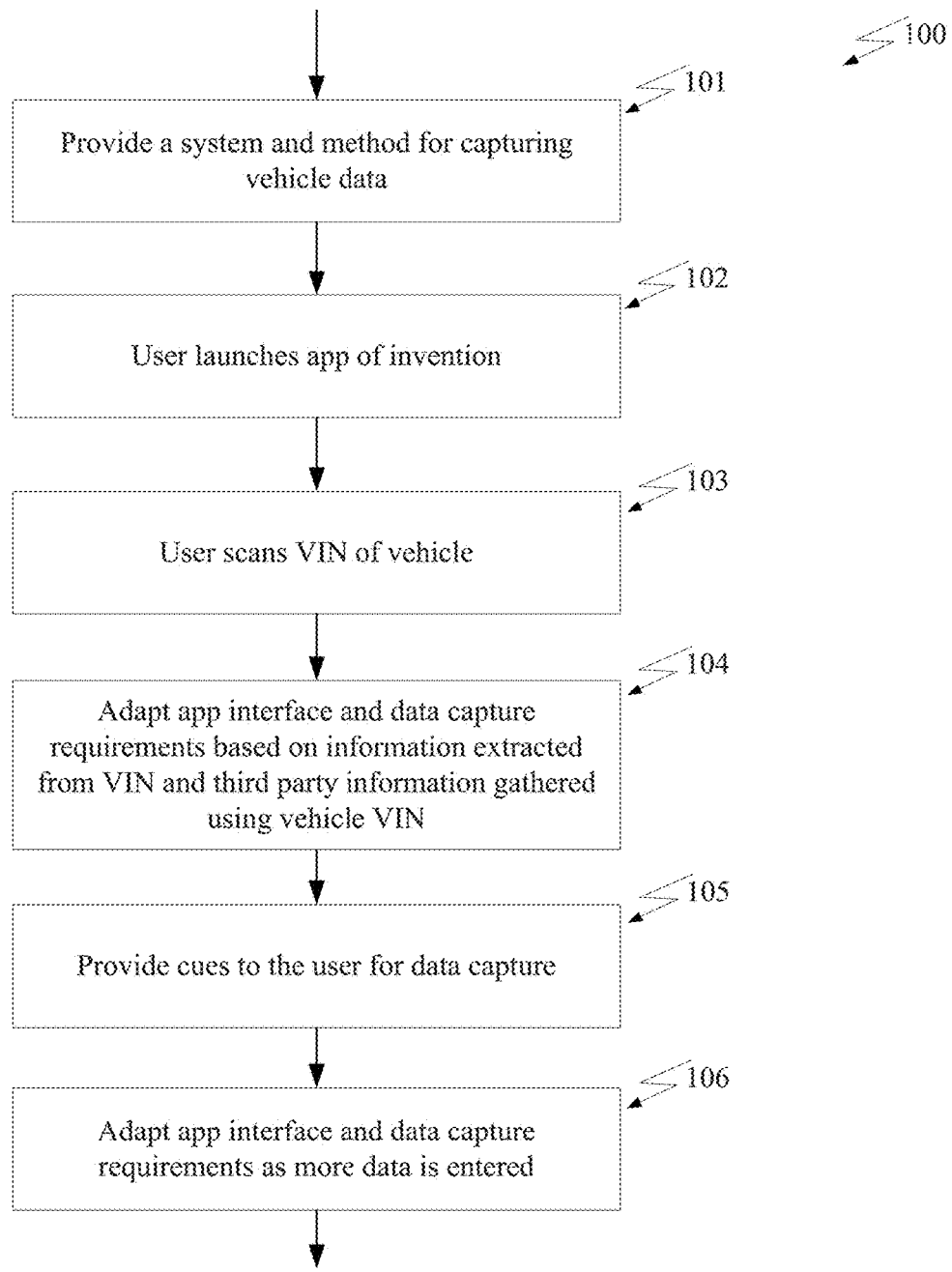
FIG. 1 is flow diagram of a basic outline of one presently preferred embodiment of the method.

Before embodiments are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

The present invention may be embodied in a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

In order to provide a context for the various aspects of the disclosed invention, as well as the following discussion are intended to provide a brief, general description of a suitable environment in which the various aspects of the disclosed invention may be implemented. While the invention has been described in the general context of computer-executable instructions of a program that runs on one or more computers, it will be appreciated that the invention also may be implemented in combination with other program modules. Generally, program modules include routines, programs, components, data structures, etc. that perform particular tasks and/or implement particular abstract data types. Moreover, it will be appreciated that the system and method may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch or other electronic gadgets incorporating the capacity to compute), microprocessor-based or programmable consumer or industrial electronics, and the like. The illustrated aspects may also be practiced in distributed computing environments where tasks/routines/processes etc. are performed by remote processing devices that are linked through a communications network e.g. a local area network (LAN) or the Internet. However, some, if not all aspects may be practiced on stand-alone computer(s). In a distributed computing environment, program modules may be located in both local and remote memory storage devices.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. Some embodiments may use well-known open-source Web development platforms using Linux, Apache, MySQL and PHP. Other examples of environments and frameworks using which computer code may also be generated are Ruby on Rails which is based on the Ruby programming language, or node.js which is an event-driven server-side JavaScript environment.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The code is specialized to execute functions described herein which enable a smoother and more efficient technological process.

Computing devices that enable a user to engage with internet in general may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad. Phone etc.). An application or an app or other simulation may be stored on a storage media such as a USB memory key, flash memory, or other type of memory media all collectively referred to as "removable media" in this disclosure. The app may also be downloaded from the internet. The removable media can be inserted to the console of a computing device where it is read. The console can then read program instructions stored on the removable media and present a user interface to the user. The user interface may preferably be a graphical user interface (GUI). Example of such computing devices are personal computers e.g. a laptop or a Mac, a Smartphone, a tablet, a SmartTV, etc.

The invention enables a standardized and verifiable data collection mechanism for vehicle information. The process only collects from a user what is not available through verifiable direct or database sources, and only collects what is relevant to a particular vehicle, including a full multimedia capture of the relevant aspects of the vehicle (good or bad). This enables savings of human effort, and also provides cleaner, more standardized data that enables more informed and accurate evaluation and comparisons, including automated valuations. Further, as only relevant data is collected, storage savings may also accrue.

For example, such data may be used for vehicle valuation as part of a system such as the one described in U.S. Ser. No. 14/728,542 (System and Method of Vehicle Value Assessment), or in the context of an arbitration system such as the one described in U.S. Ser. No. 14/794,571 (System and Method of Automatic Arbitration in Vehicle Trading), both flied by the same applicants, and both incorporated herein by reference.

FIG. 1 shows a presently-preferred embodiment 100. A system and method is provided for capturing vehicle data 101. This may be implemented on a server such that it is accessible over the Internet through a computing device, like a Smartphone, a tablet or the like. Devices where the invention can be advantageously used include but are not limited to personal computers e.g. laptops, tablet computers, touch-screen computers running any number of different operating systems e.g. MS Windows, Apple iOS, Linux, Ubuntu, etc. Smartphones like an iPhone, an Android phone, tablets like iPad and the like.

Many factors may influence the data capture requirements of a vehicle, thus having the correct information is paramount in determining an accurate assessment. In one embodiment the data capture requirements for a vehicle are dependent on its make, model, year, type, mileage, installed options, condition, value, the region where the vehicle had been used in the past, amongst other factors.

The user launches the app 102. Preferably the users may connect to the system using a connected device e.g. a Smartphone, a tablet, or a personal computer where the app executes. In one embodiment the app may be downloaded from an AppStore.

In one embodiment there may be a purpose built application using which a user may interact with the functionality provided by the system. The application may be specific for a particular mobile device e.g. an iPhone or a Google Android phone, or a tablet computer etc. or cross-platform compatible e.g. Flash or HTML5 based app that can be used in a browser.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing different functions may be included in a computer readable storage medium or other computer program product configured for execution by one or more processors.

The user scans the VIN of the vehicle 103. In one embodiment this may be done using the connected device. A VIN (Vehicle Identification Number) is a unique code including a serial number, used by the automotive industry to identify individual motor vehicles. The first three characters uniquely identify the manufacturer of the vehicle using the world manufacturer identifier or VIN code. There are 17 numbers and letters (17 positions) in a VIN and these can be divided into three groups: World Manufacturer Identifier, Vehicle Descriptor Section, and Vehicle Identifier Section.

In one embodiment the VIN may be acquired by performing a VIN scan using a mechanised method to automatically machine read the VIN from the vehicle. In one embodiment a VIN may be optically read with barcode scanners or digital cameras, or digitally read via OBD-II (On Board Diagnostics) available in some vehicles. In one embodiment there may be a Smartphone based app that can capture the VIN from a vehicle and transmit it to the server for processing (decoding and gathering information from third parties).

In another embodiment the VIN may be inputted into the app by the user by physically reading it from the vehicle; the user input may be text or voice. Typically the VIN is stamped into a plate that's mounted on the dashboard near the windshield or on the driver-side door jamb. It is also stamped on the engine's firewall. Such an embodiment may provide a user interface for inputting the VIN. User input may be provided via text or voice or other methods.

The VIN is then decoded to decipher the information that is contained in the VIN. VIN decode or VIN explosion reveals the information that is encoded in a VIN. The VIN can reveal a number of things about a car, including its airbag type, country of origin, engine size, model year and trim level. VIN can be decoded using third party services. This information may be used to get further information about the vehicle from third parties.

Some information about a vehicle may not be available from the MN, e.g. color, engine size, installed options may not be available. Such information may be obtained from third parties by querying their databases by supplying the VIN and getting information.

In one embodiment the system and method may use the VIN to acquire information about the vehicle from internal resources e.g. data saved to a server. In another embodiment send VIN and other vehicle identification information to different third party sources to acquire more detailed information about the vehicle.

The app interface and data capture requirements are adapted based on information extracted from VIN and information gathered from third parties using VIN 104. The app interface and data capture requirements change to match the information gathered from the VIN. For example, if the VIN reveals that the vehicle is a 4-door sedan then the user is asked to take 4 photos and 1 video but if the VIN reveals that the vehicle is a 2-door convertible then the user is asked to take photos 8 photos and 3 videos.

The user is provided with cues for data capture 105. The preferred embodiment may provide a graphical user interface using which a user may be cued or guided for taking photos and videos of the vehicle. For example in one embodiment for a 4-door sedan a user may be asked to take one photo each from the front, back, and either side. Similarly if the vehicle is a 2-door convertible then the user may be instructed to take one photo each from the front, back, and either side as well as take photos with the top on and top off.

The app interface and data capture requirements adapt as more data is entered 106. In one embodiment as more data is captured the app interface and data capture requirements are continuously adapted to adjust to this information and provides the user with the cues that are in accordance to this information. Thus if a user states the vehicle has 2 sets of tires e.g. one set is all season tires while the other set is winter tires, the app may instruct the user to take photos of each set of tires.

Some exemplary factors that have an impact on the number and the data capture points take into consideration the following:

VIN number of the vehicle
Make, model and year of the vehicle
Type of vehicle
Resale value of the vehicle
Mileage
Factory installed options
After market installed equipment e.g. audio/video console In some embodiments the videos audio are suited for capturing the following.

engine noise
exhaust system e.g. smoke, fumes from the tail pipe
condition of tires
condition of windshield
noise from the transmission
noise from the brakes
electrical system, indicators, headlights
condition of body e.g. rust
body damage e.g. dents due to an accident
condition of interior Other information that cannot be captured by text may also be captured using digital (multimedia) means like videos and audio. The above lists are exemplary and are not intended to be exhaustive.

Figure 2:
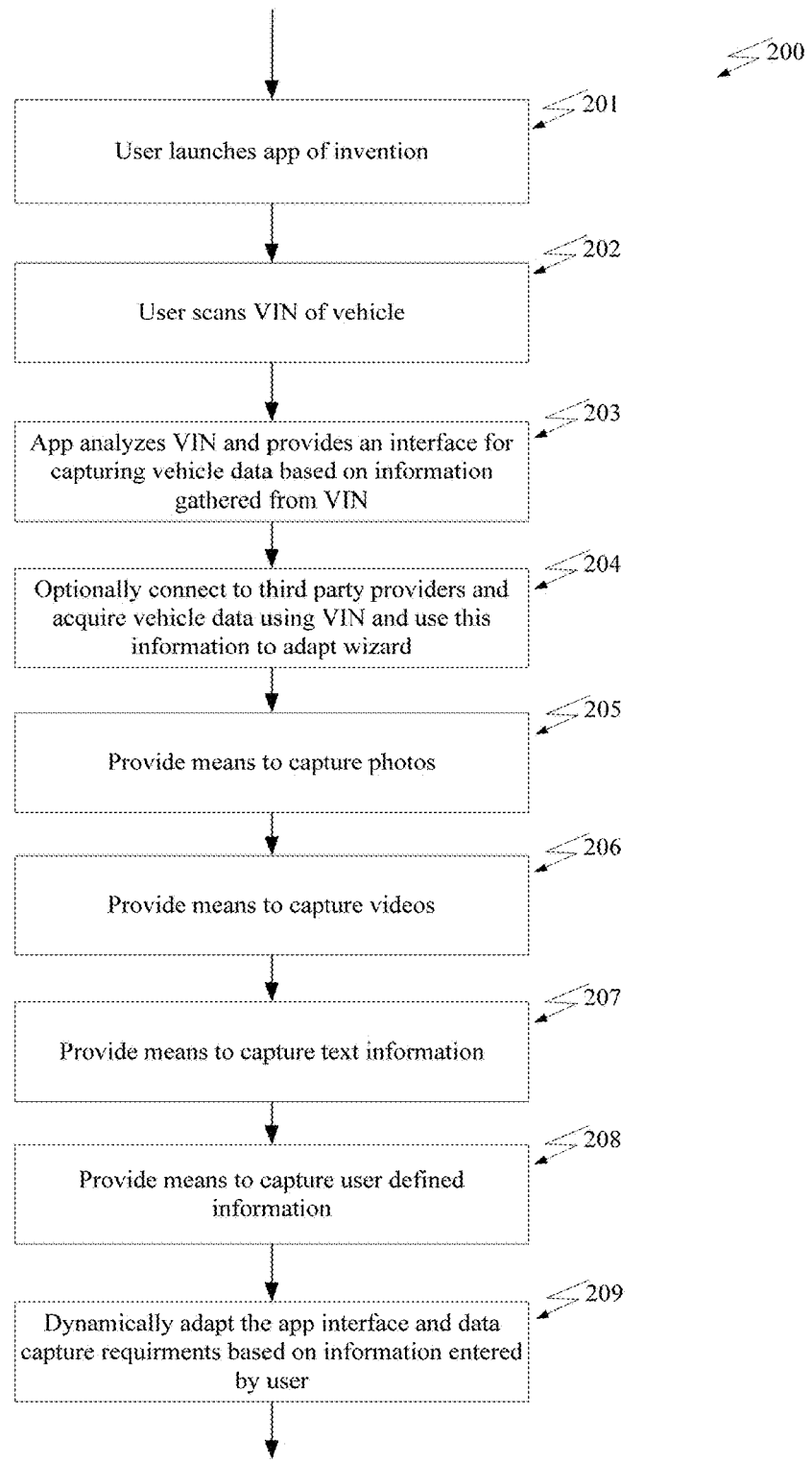
FIG. 2 is a flow diagram showing capture and input of fields through an app.

FIG. 2 shows a presently-preferred embodiment 200. The user launches the app 201. The user scans the VIN of the vehicle 202. In one embodiment the user scans the VIN of the vehicle using either a mechanized method e.g. using an app to capture the VIN photo and then sending that photo to the server to machine read the VIN number. In another embodiment a user may input the VIN by physically reading the VIN from the vehicle and inputting the text into the app interface. Optionally there may be a VIN verification process built into the system, such that if a user provides an incomplete or inaccurate VIN number the system alerts the user to correctly input the VIN number.

The app analyzes the VIN and provides an interface for capturing vehicle data based on the information gathered from VIN 203. In one embodiment the vehicle information including a vehicle's make, model, year, installed options, mileage, color, region where the vehicle is from etc. may have an impact on the vehicle data capture points. The aforementioned list of factors is exemplary and different factors may be used that can influence the assessed value of a vehicle. Additionally any number of different combinations and permutations of these factors may be used in other embodiments.

Optionally, the app connects to third party providers and acquires vehicle data using the VIN and uses this information to adapt the form wizard 204. Vehicle data and condition information may be acquired from different sources. In one embodiment additional vehicle information like its specific installed options; its condition e.g. any accidents, any dents, any paints jobs, any major or minor repairs etc; its history e.g. whether the vehicle is single owner, multi-owner, was it a previous daily rental, the region where the vehicle was driven etc. any major or minor recalls of the vehicle by the manufacturer amongst other things, may be acquired from third parties using the VIN. Such data may be acquired from third parties by querying their online databases using VIN of the vehicle.

In one embodiment the vehicle history data may be acquired from third parties. Examples of such third parties from vehicle history data may be acquired are Carproof, Experian (Autocheck) and CarFax. Such third parties may provide vehicle history data that may include but is not limited to registration, accidents, liens, title (rebuilt, stolen, flooded).

In one embodiment the vehicle service history may be acquired from third parties. It is well known that major repairs to vehicle may have an impact on the resale value of a vehicle, while normal maintenance performed at prescribed intervals such as oil changes, tune ups and replacement of belts and hoses etc. contributes positively towards the resale value of a vehicle. Examples of such third parties from vehicle service history may be acquired are dealerships, authorised repair workshops, etc.

In one embodiment the vehicle accident data may be acquired from third parties. Examples of such third parties from vehicle accident data may be acquired are Carproof, Experian (Autocheck) and CarFax. For example if a vehicle had a major accident and has been repaired, the user may be guided to take photos and videos of the area that was repaired after the accident.

Means is provided to capture photos 205. The app preferably provides a photo capture means (i.e. multimedia mode in the interface), for example that prompts the user to take a given number of photos (e.g. in multimedia "slots") from given vantage points that are determined by the information gathered from the VIN. In some embodiments the photos may be captured by using a camera that is built in a mobile device e.g. a Smartphone or an iPad.

Means is provided to capture videos 206. The app preferably provides a video capture means (i.e. multimedia mode in the interface), for example that prompts the user to take a given number of videos (e.g. in multimedia "slots") from given vantage points that are determined by the information gathered from the VIN. In some embodiments the videos may be captured by using a camera that is built in a mobile device e.g. a Smartphone or an iPad.

Means is provided to capture text information 207. The app preferably provides text capture means (i.e. text entry mode in the interface), for example that prompts the user to add text information or may provide drop down menus using which a user inputs text information in various relevant fields of the form that are not otherwise pre-filled or pre-populated. What text information is to be inputted by the user may preferably be determined by the information gathered from the VIN. The app may preferably provide a user interface e.g. a touch screen interface using which a user may add the text information about the vehicle.

Means is provided to capture user defined information 208. The app preferably provides means to capture user defined information, for example that prompts the user to add photos, videos, audio or text information for any particular items that may not have already been provided by the system. For example a user may state that the vehicle has two sets of rims and tires, thus the system will prompt the user to take photos of both sets of rims and tires. The app may preferably provide a user interface e.g. a touch screen interface with drop down menus using which a user may add user defined information.

The app interface and data capture requirements dynamically adapt based on information entered by user 209.

The app may not proceed to the next stage if the user has failed to provide all the information that is required for the current stage.

Alternatively, the app may proceed to the next stage even if the user is missing some information at the current stage but at a later point it will prompt the user to add the missing information and preferably may not submit the vehicle data for online sale or appraisal if any information is missing (i.e. the completion must be certified prior to allowing submission of the form data).

Figure 3:
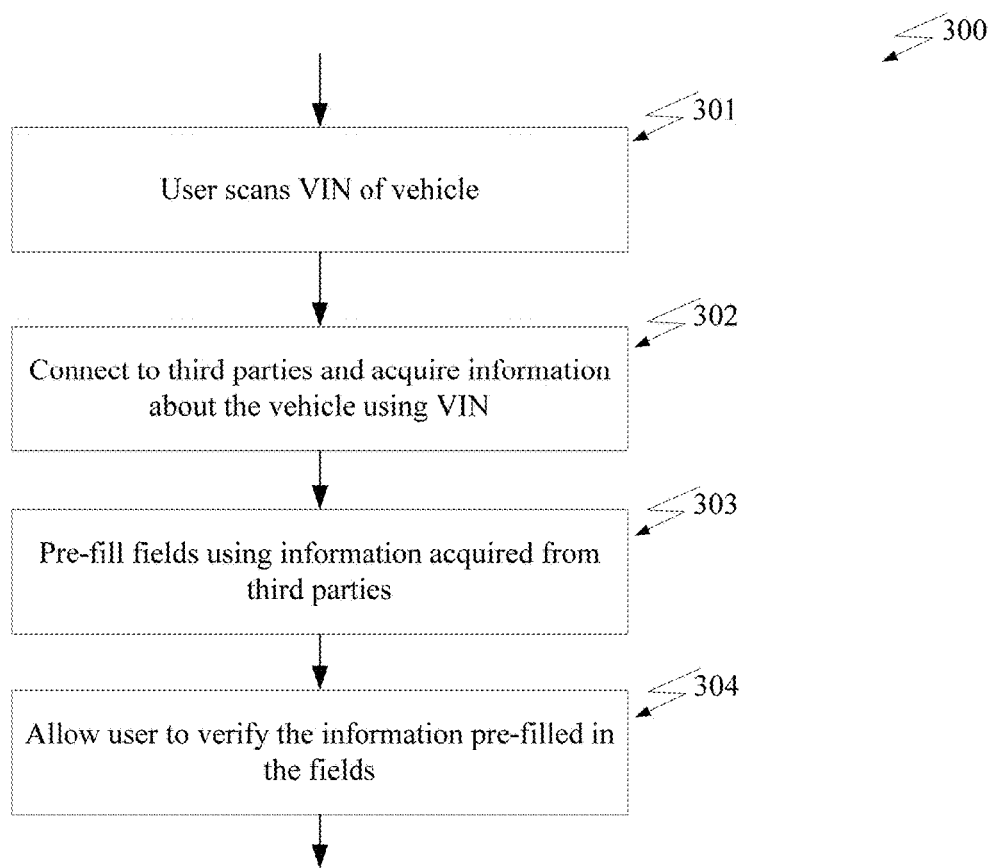
FIG. 3 is a flow diagram showing detail with respect to VIN capture and decoding.

FIG. 3 shows one embodiment 300. The user scans the VIN or enters it manually 301. In one embodiment the user scans the VIN of the vehicle using a mechanized method while in another embodiment the user provides the VIN by manually entering it into the interface of the app.

The system connects to third parties and acquires information about the vehicle using VIN 302. Additional vehicle information that may be acquired from third parties includes but is not limited to its installed options; its condition e.g. any accidents, any dents, any paints jobs, any major or minor repairs etc; its history e.g. whether the vehicle is single owner, multi-owner, was it a previous daily rental, the region where the vehicle was driven etc. any major or minor recalls of the vehicle by the manufacturer amongst other things. Such data may be acquired from third parties by querying their online databases using VIN of the vehicle.

Third parties may include but are not limited Carproof. Experian (Autocheck) and CarFax for acquiring vehicle history data for example it may include but is not limited to registration, accidents, liens, title (rebuilt, stolen, flooded).

The fields of the form may be pre-filled (pre-populated) using the information acquired from third parties 303 which may then be displayed through the graphical user interface to the app.

The user may be allowed to verify the information pre-filled in the fields 304. Thus firstly the user verifies the information that has been acquired from third parties and secondly the user has the option to complete any information that is incomplete or add any information that is missing.

In some embodiments the third party data may arrive with some delay, thus a user may be required to take extra photos, videos and provide additional text information out of sequence based on impact of this third party information. For example if third party information reveals that the vehicle had an accident and the rear bumper was repaired, the user may be prompted to take close up photos of the area of the rear bumper where the repair was done.

Figure 4:
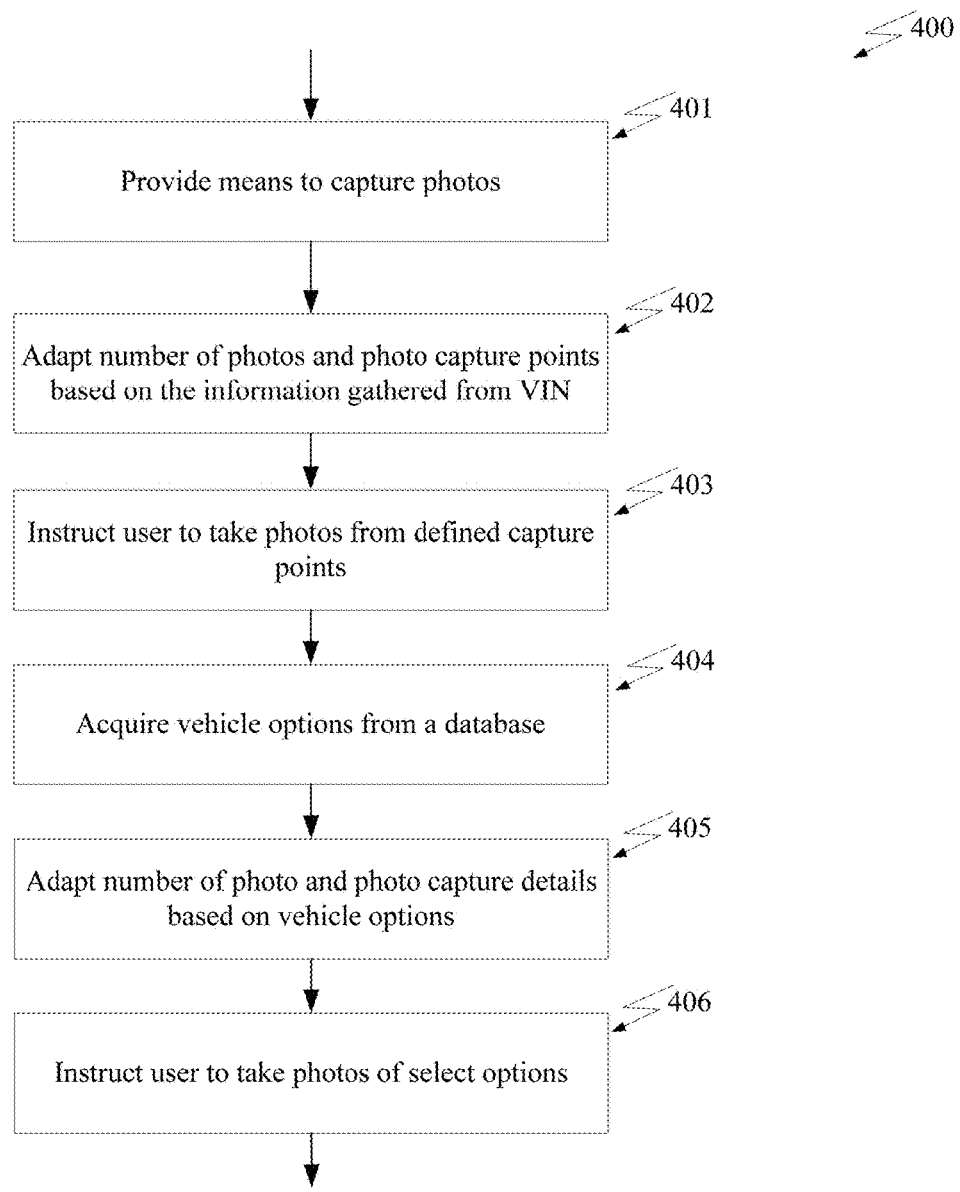
FIG. 4 is a flow diagram showing detail with respect to photo capture.

FIG. 4 shows one embodiment 400. Means are provided to capture photos 401. In one embodiment the app provides a photo capture means, for example it provides an interface that prompts the user to take a give number of photos from given vantage points that are determined by the information gathered from the MN.

The number of photos and photo capture points are adapted based on the information gathered from the VIN 402. In one embodiment the number of photos and the position/angle of the camera when the photo is being taken is determined by the information gathered from the VIN and the information acquired from third parties using the VIN.

The user may be instructed to take photos from defined capture points 403. In one embodiment preferably the user may be instructed to stand at a certain distance from the vehicle and hold the camera at a certain angle while taking the photos. In one embodiment there may be for example a graphical representation (e.g. outline) of the vehicle that instructs the user what the correct distance and angle are, and if the user is off the mark the app guides the user till the correct distance and angle are reached.

Vehicle options may be acquired from a database 404. The database of installed options for different vehicles may be local or may be hosted by third parties that specialize in gathering such information for different makes, models and years of vehicles in either a given area or globally.

The number of photos and photo capture details is adapted based on vehicle options 405. In one embodiment adapt number of photos and photo capture details based on vehicle options.

The use may be instructed to take photos of select options 406.

Figure 5:
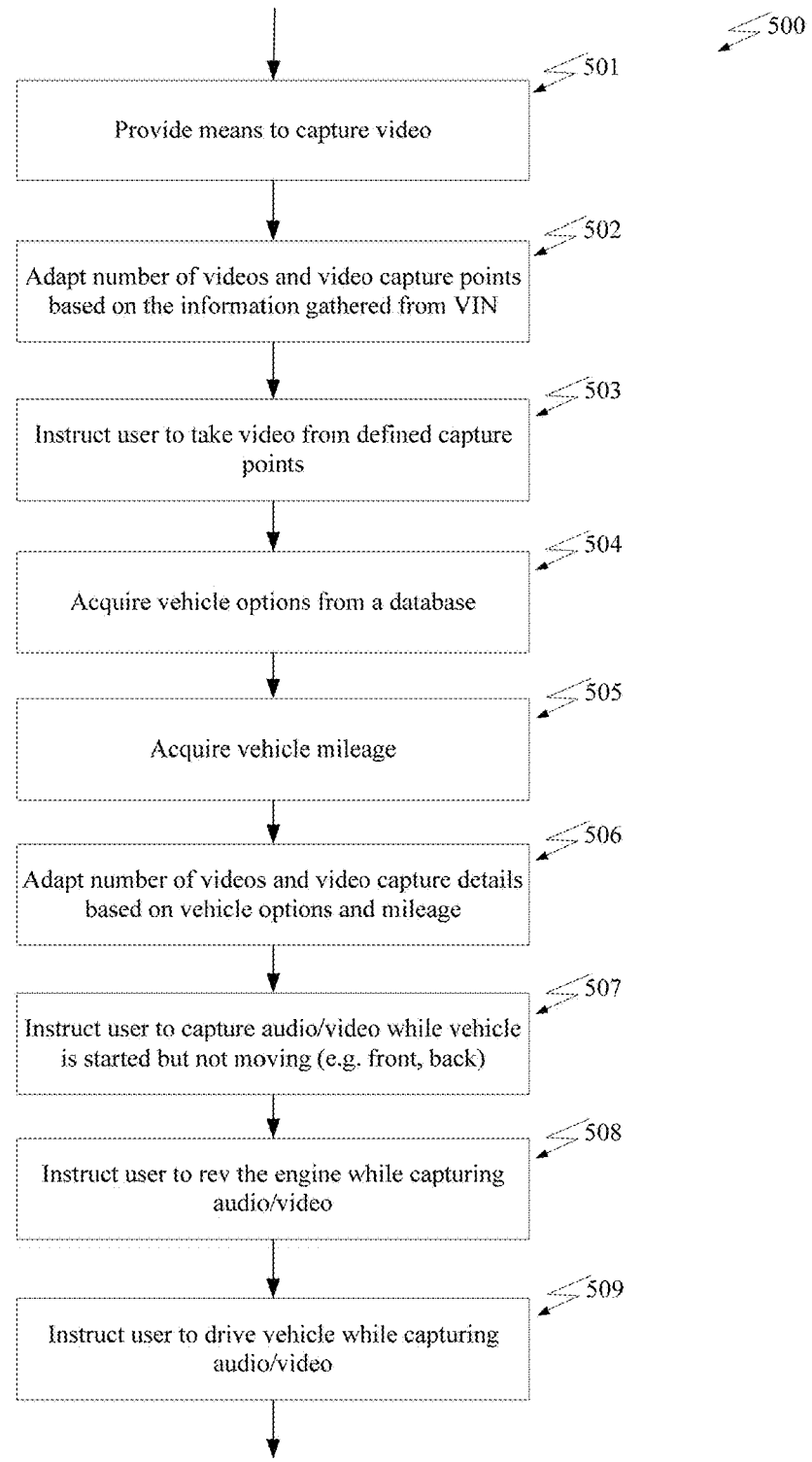
FIG. 5 is a flow diagram showing detail with respect to video capture.

FIG. 5 shows one embodiment 500. Means is provided to capture video 501. In one embodiment the app provides a video capture means, for example it provides an interface that prompts the user to take a give number of videos from given vantage points that are determined by the information gathered from the VIN.

The number of videos and video capture points is adapted based on the information gathered from the VIN 502. In one embodiment the number of videos and the position angle of the camera when the video is being recorded is determined by the information gathered from the VIN and the information acquired from third parties using the VIN.

The user may be instructed to take video from defined capture points 50. In one embodiment preferably the user may be instructed to stand at a certain distance from the vehicle and hold the camera at a certain angle. There may be for example a graphical representation of the vehicle that instructs the user what the correct distance and angle are, and if the user is off the mark the app guides the user till the correct distance and angle are reached.

Vehicle options may be acquired from a database 504. The database of installed options for different vehicles may be local or may be hosted by third parties that specialize in gathering such information for different makes, models and years of vehicles in either a given area or globally.

Vehicle mileage may be acquired 505. For example, vehicle mileage data may be acquired from On Board Diagnostics (OBD). Alternatively vehicle mileage data may be acquired by using image/photo analysis of odometer. The vehicle mileage may also be user provided.

The number of videos and video capture details are adapted based on vehicle options and mileage 506.

The user may be instructed to capture audio/video while vehicle is started but not moving 507. In some embodiments the user may be cued to walk around the running vehicle while capturing audio/video.

The user may be instructed to rev the engine while capturing audio/video (while vehicle is started but not moving) 508. In some embodiments the user may be cued to walk to the front of the vehicle and then the rear of the vehicle while capturing audio/video and the vehicle is being revved.

The user may be instructed to drive the vehicle while capturing audio/video 509. For safety reasons the user may be instructed to get help from another person or there may be a means for holding the device in a given position while recording the video so that the user can drive safely with both hands.

It should be noted that the steps described above nay be in any given sequence, in fact in some implementations the user may be required to go back and add more photos/videos as information from third parties is acquired in either real time or non real time e.g. if a query to a third party reveals that the vehicle has had an accident in the past then the user may be prompted to take extra photos and videos of the area that had sustained the damage to accurately capture the quality of the repair work.

Figure 6:
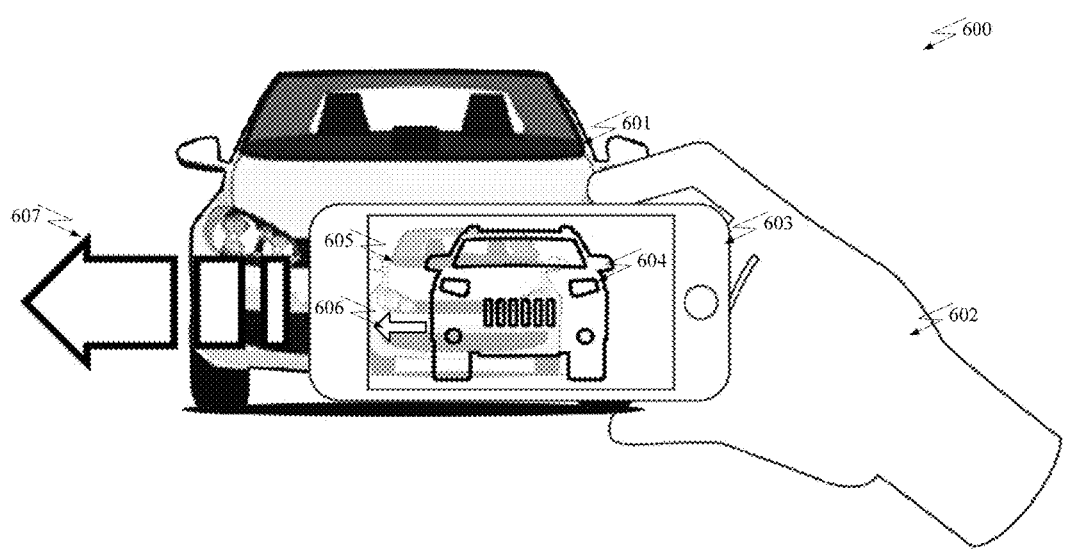
FIG. 6 shows exemplary user guidance for multimedia capture where a vehicle is initially misaligned (here, the guidance uses arrows and vehicle outline on the camera user display).

FIG. 6 shows one embodiment 600. FIG. 6 depicts data for a vehicle 601 being collected by a user 602. User 602 is holding a mobile device 603 where app is installed. The mobile device 603 display shows a sketch-line of a vehicle 604, and the user is cued to align the sketch-line 604 with the image of the vehicle 605 that may be captured by the camera built into the mobile device 603.

As can be seen from FIG. 6, that the sketch-line 604 is not fully aligned with the image of the vehicle 605 and an arrow 606 cues the user to move the mobile device 603 in the direction of the arrow 606. Arrow 607 depicts the actual moving of the mobile device 603 by the user 602 in the direction of the cued arrow 605.

It should be noted that the sketch-line 604 of a vehicle may be different for each vehicle type or vehicle make, model and year. There may be several sketch-lines of different vehicles available in the app and by using the information derived from the VIN, the correct sketch-line of the relevant vehicle may be over-layed the image of the vehicle to cue the user accurately to capture visual data about the vehicle. Thus we note that FIG. 6 shows a vehicle 601 that is an SUV and the sketch-line 604 also shows an SUV that is either same or similar to the actual vehicle to guide the user to capture the visual data accurately.

Figure 7:
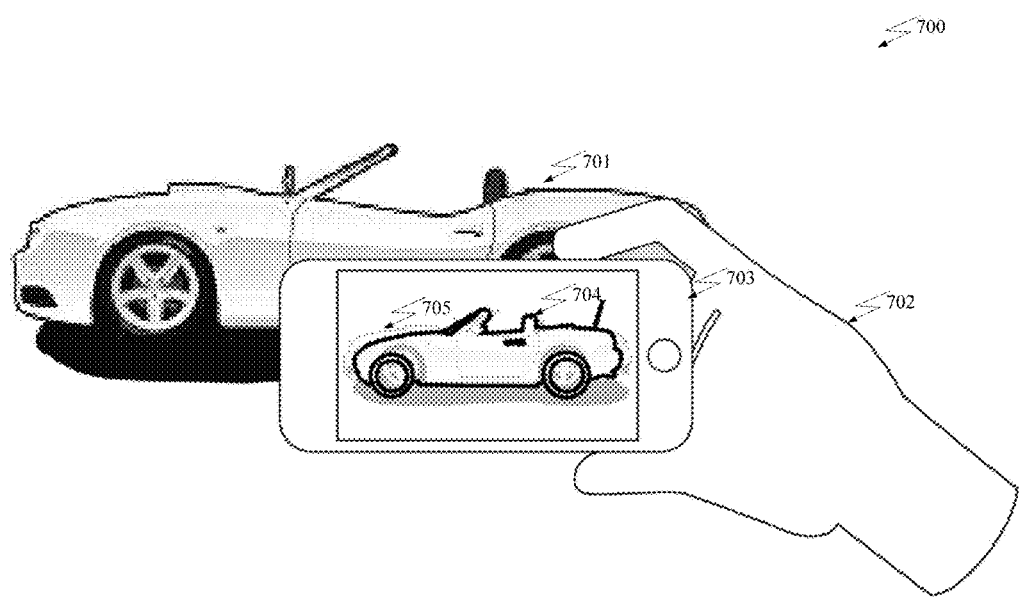
FIG. 7 shows exemplary user guidance where a vehicle is aligned with the vehicle outline.

FIG. 7 shows one embodiment 700. FIG. 7 depicts data for a vehicle 701 being collected by a user 702. User 702 is holding a mobile device 703 where app is installed. The mobile device 603 display shows a sketch-line of a vehicle 704 that is well aligned with the image of the vehicle 705 that may be captured by the camera built into the mobile device 703.

As can be seen from FIG. 7, the user has positioned the mobile device 703 correctly to fully align the sketch-line 704 with the image of the vehicle 705 and no arrows cueing the user to move are displayed by the app.

It should be noted that the sketch-line 704 may be different for each vehicle type or vehicle make, model and year. Thus we see that the vehicle 701 is a convertible and the sketch-line of a convertible vehicle 704 that has been over-layed the image of the vehicle 705 to cue the user accurately to capture visual data about the vehicle.

In one embodiment similar sketch-lines or guidance lines or other means may also be provided in the app for assisting the user to capture photos/videos for the vehicle interior options e.g. navigation system, odometer, dashboard etc. and vehicle exterior options e.g. rims, tires, tail-lights, head-lights, etc.

Figure 8:
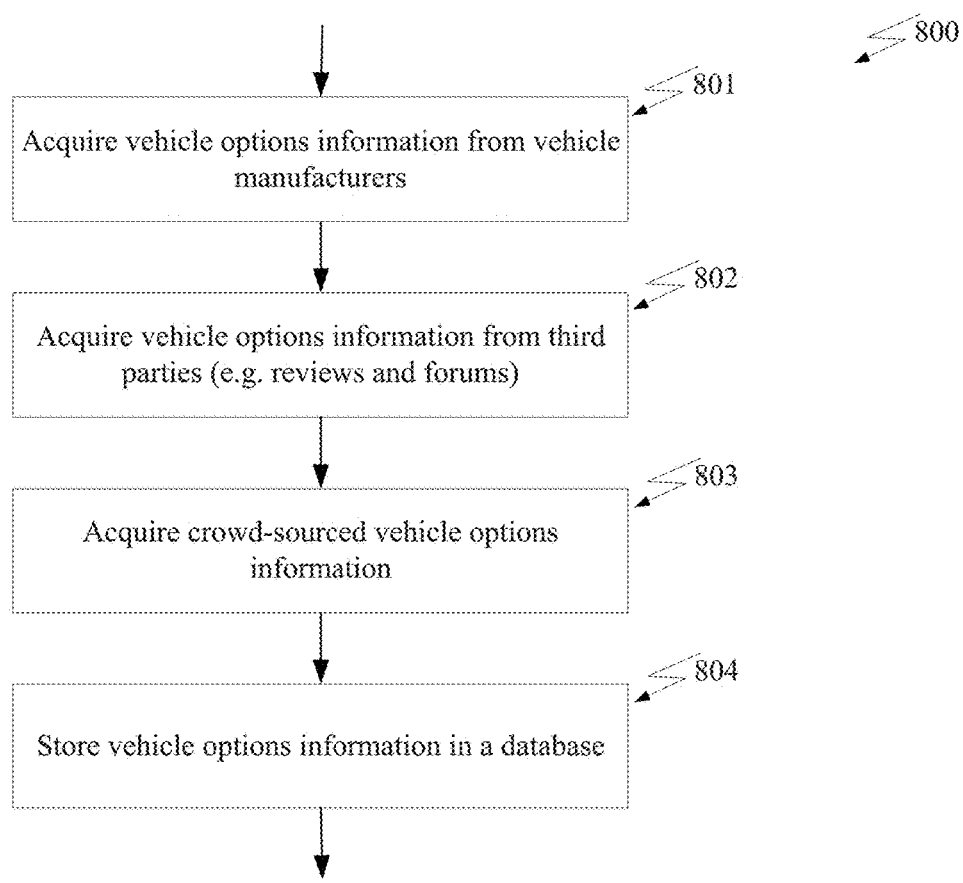
FIG. 8 is a flow diagram showing detail with respect to retrieval of options data from various sources.

FIG. 8 shows one embodiment 800. Vehicles vary greatly in terms of the options that are installed in different models of the same make and year. For example a Honda Civic DX is lower end vehicle with fewer installed options that the Honda Civic LX of the same year.

Vehicle options information may be acquired from vehicle manufacturers 801. Such information may be digitally available from vehicle manufacturers and added to the system as new models of vehicles are released. In another embodiment this information may be added to the system manually.

Vehicle options information may be acquired from third parties like forums and reviews 802. Such information may be digitally available from forums and reviews and added to the system as new forums and reviews are published. In another embodiment this information may be added to the system manually.

Crowd-sourced vehicle options information may be acquired 803. Such information may be digitally available by providing a graphical user interface using which people can add information into the system. In another embodiment this information may be added to the system manually.

The vehicle options information may be stored in a database 804. In one embodiment the vehicle options information is stored in a database preferably on a server that is accessible online so that the app can remotely connect to the server and query the database to acquire the installed options details of a given vehicle.

Crowd sourced installed options information may be used e.g. an interface may be provided using which scores of people (crowd) may provide the actual options installed in a number of different makes and models of vehicles. In one embodiment in order to verify the data added by the crowd, multiple people may be asked to provide the installed options for a given make, model, year of vehicle to ensure accuracy.

Vehicle installed options information may be acquired from third parties like dealerships, authorised repair work-shops, etc. In another embodiment information about vehicle installed option may be provided by a user.

Vehicle data may be acquired from On Board Diagnostics of a vehicle. Such data may be obtained from a vehicle by plugging devices to the standard On Board Diagnostics ports that are available in most new vehicles. The number of photos/videos and the capture points may be adapted based on the information gathered from On Board Diagnostics.

The system may also consider the condition of the vehicle body and any damage that it may have sustained over its life. For example if visual analysis of captured photo or video reveals that there are any dents or if there is any rust the user may be asked to take close up photos or videos of the damaged area. The user may be cued when taking the close ups to adjust the distance of the camera and the angle by providing guide lines.

The user may be instructed to take photos of each of the tires to assess if the tires are worn out or are in good shape.

The user may be instructed to record video/audio to assess the condition of the engine. Optionally the user may be required to rev the engine while recording the video/audio to capture any engine noise at high RPM.

The system may also consider the condition of the vehicle's transmission and damage or major repairs that it may have had over the lifetime of the vehicle. For example the user may be instructed to drive the vehicle so that any issues with the transmission can be captured to assess its condition and if it needs repairs or replacement.

The user may be instructed to take close up photos of the windshield to assess if the windshield has any chips or cracks in it and requires a replacement.

The user may be instructed to take close up photos of the interior of the vehicle to get a better assessment on the condition of the seats, the instrument panel, the navigation system etc.

The system may also consider the mileage of the vehicle. For example if there are two vehicles of the same make, model, year but the first vehicle has been driven 20,000 miles and has a value of $10,000; while the second vehicle has been driven 80,000 miles and has a value of $5,000; then the user of the first vehicle may be required to take a photo of the odometer and that photo is processed using OCR to verify the low mileage of the first vehicle, while the user of the second vehicle may not be required to take a photo of the odometer.

The system may also consider the vehicle service history. Vehicle service history may be acquired from third party providers like dealerships, and may include information whether the vehicle has had regular maintenance performed at the prescribed intervals as suggested by the manufacturer. For example if a first vehicle has not been regularly serviced and/or was not serviced at the dealership the user may be required to record multiple video/audio streams capturing the engine noise and other indicators that can be used to judge its condition whereas if a similar vehicle that has been serviced regularly at the dealership and the service records are readily available may not be required to capture these extra video/audio streams.

The system may also consider the installed options in a vehicle. For example if the vehicle has leather seats and navigation then the user may be required to take close up photos of the seats and the instrument panel with the navigation system running.

The system may also consider the history of the vehicle. History may include but is not limited to vehicle title history, the number of previous owners, who those owners were etc. For example if the vehicle is a single owner vehicle, then the user may not be required to take close ups of the interior but if the vehicle has had multiple owners or if the vehicle was a previous daily rental then the user may be required to take extra close ups of interior and exterior as the vehicle may have had more wear and tear.

Figure 9:
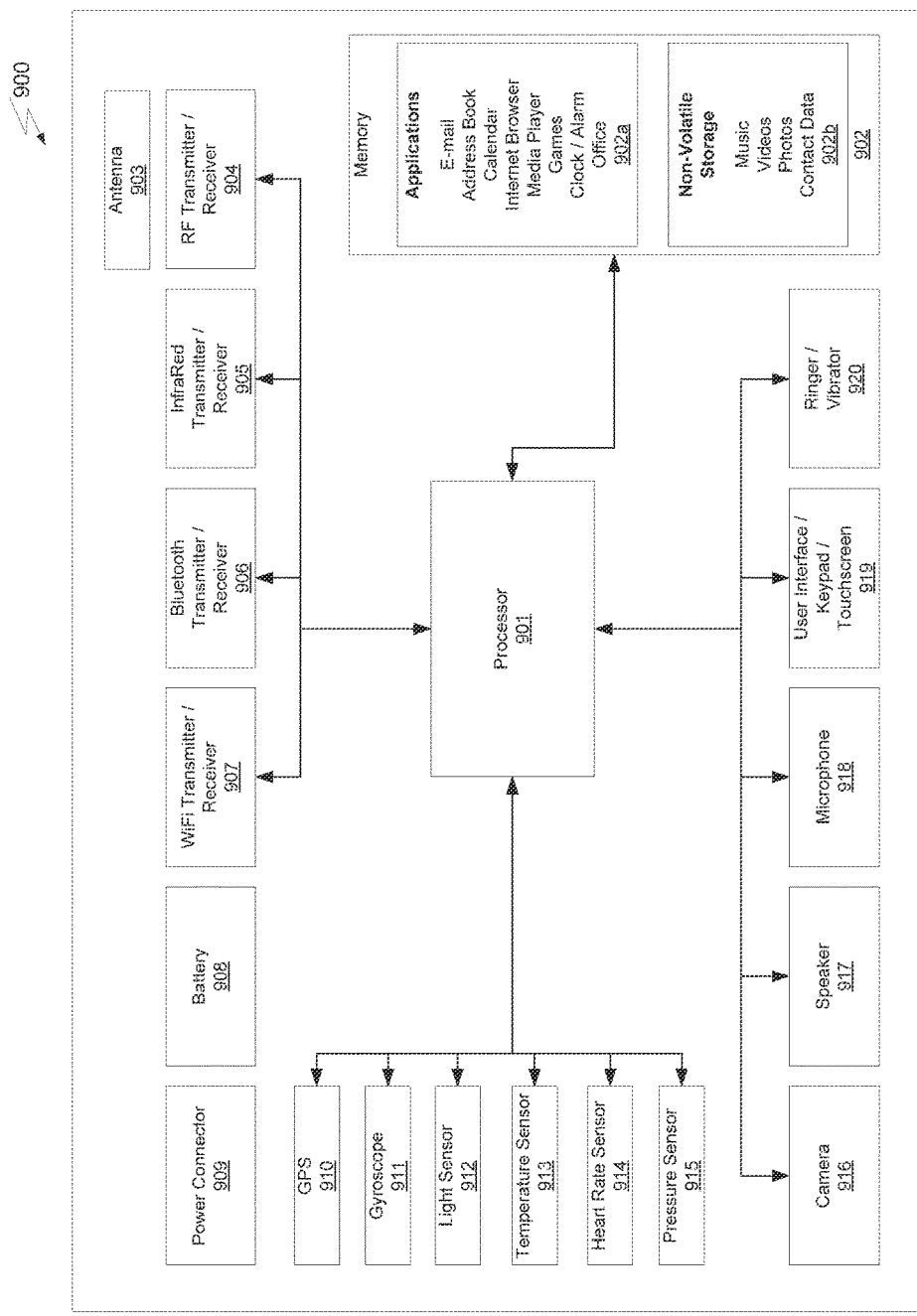
FIG. 9 is a functional diagram of mobile device showing certain components.

FIG. 9 depicts an exemplary block diagram of a mobile device 900. Exemplary electronic circuitry of a typical mobile phone are shown; other devices may differ and may either omit or have electronic components not shown here. The mobile device 900 includes one or more microprocessors 901, which is electronically coupled to other electronic components such as memory 902 (e.g., non-volatile memory such as ROM and volatile memory such as RAM) which stores processor-readable code which is executed by one or more processors of the control processor 901 to implement the functionality described herein.

Mobile device 900 may include, for example, processors 901, memory 902 including applications 902a and non-volatile storage 902b. The processor 901 can implement communications, as well any number of applications, including the applications discussed herein. Memory 902 can be any variety of memory storage media types, including non-volatile and volatile memory. In the present invention, form data (both captured/retrieved and input) may be stored in memory on the device. Such data may also be transmitted or uploaded to a remote storage (e.g. a central server). A device operating system handles the different operations of the mobile device 900 and may contain user interfaces for operations, such as placing and receiving phone calls, text messaging, multi-media messaging, checking voicemail, e-mail, games and the like. The applications 902a can be any assortment of programs, such as a camera application for photos and/or videos, an address book, a calendar application, a media player, an internet browser, games, an alarm application, other third party applications, the applications discussed herein, and the like. The non-volatile storage component 902b in memory 902 contains data such as web caches, music, photos, contact data, scheduling data, and other files.

The processor 901 also communicates with RF transmitter/receiver circuitry 903 which in turn is coupled to an antenna 904, with an infrared transmitter/receiver 905, with a Bluetooth transmitter/receiver 906 a WiFi transmitter/receiver 907, a battery 908, a power connector 909, a GPS 910, a gyroscope 911, a light sensor 912, a temperature sensor 913, a heart rate sensor 914, a pressure sensor 915, a camera 916, a speaker 917, a microphone 918, a user interface/keyboard or a touchscreen 919, and a ringer/vibrator 920.

The processor 901 also communicates with Infrared transmitter/receiver circuitry 905. The way this technology works is that the infrared transmit component flashes an infrared light in a particular pattern, which another component (the infrared receiver) can pick up and translate into an instruction. These transmitters and receivers are also typically found in remote controls and are now embedded in mobile devices that can turn them into remote control devices. They typically generate infrared using light emitting diodes (LEDs), and the main component of a receiver unit is usually a photodiode.

The processor 901 also communicates with Bluetooth transmitter/receiver circuitry 906. Bluetooth is a standard wire-replacement communications protocol primarily designed for low power consumption, with a short range. Bluetooth provides a secure way to connect and exchange information between devices such as mobile phones, laptops, personal computers etc. A Bluetooth-enabled mobile device is able to pair with many other devices for communications.

The processor 901 also communicates with WiFi transmitter/receiver circuitry 907. WiFi is a technology that allows an electronic device to exchange data or connect to the internet wirelessly using radio frequencies. Thus the embedded WiFi transmitter/receiver circuitry 907 in a mobile device allow it to connect to the internet for communications. A Wi-Fi-enabled mobile device can connect to the Internet when within range of a wireless network which is configured to permit this. Such communications processes may be used in the present invention, for example, for querying/retrieving VIN decode information, querying/retrieving data from other databases, and to upload form data.

A battery 908 provides a power source to operate the different electronic components in the mobile device 900. An electric battery is a device consisting of one or more electrochemical cells that convert stored chemical energy into electrical energy. Typically the battery 908 is a rechargeable battery.

The processor 901 controls transmission and reception of wireless signals. During a transmission mode, the processor 901 provides a voice signal from microphone 918, or other data signal, to the RF transmitter/receiver circuitry 903. The RF transmitter/receiver circuitry 903 transmits the signal to a remote station (e.g., a fixed station, operator, other cellular phones, etc.) for communication through the antenna 904. The ringer/vibrator 920 is used to signal an incoming call, text message, calendar reminder, alarm clock reminder, or other notification to the user. During a receiving mode, the RF transmitter/receiver circuitry 903 receives a voice or other data signal from a remote station through the antenna 904. A received voice signal is provided to the speaker 917 while other received data signals are also processed appropriately.

A physical power connector 909 can be used to connect the mobile device 900 to an external power source, such as an AC adapter or powered docking station. In some cases the same physical connector as the power connector 909 can also be used as a data connection to a computing device (e.g. on an iPhone). The data connection allows for operations such as synchronizing mobile device data with the computing data on another device.

A global positioning service (GPS) receiver 910 utilizing satellite-based radio navigation to relay the position of the user applications enabled for such service.

A gyroscope 911, is a device for measuring or maintaining orientation, based on the principles of angular momentum and allows for more accurate recognition of movement within a 3D space. Gyroscopes in consumer electronics are frequently combined with accelerometers (acceleration sensors) for more robust direction- and motion-sensing.

A light sensor 912, is a device for sensing light and may be used for automatically adjusting the brightness of the screen back-light both to improve battery life and make it easier to see the screen.

A temperature sensor 913, is a device for sensing and measuring temperature.

A heart rate sensor 914, is a device for sensing and measuring the heart rate.

A pressure sensor 915, is a device for sensing and measuring the pressure.

A camera 916, is a device for capturing video images (still and motion). Cameras embedded in mobile devices like mobile phones can capture digital pictures almost instantly and automatically. This enables services like multi-media messaging, video calling, and the like. The cameras embedded in mobile devices like smartphones may also be used as input devices in numerous applications, e.g. reading QR codes; where the QR codes can be sensed by the mobile device using its camera and provide a link to related digital content, via a URL. In the present invention, the onboard camera may be used for capturing still or video images of the vehicle, including images used to capture specific data for input (e.g. VIN number, odometer, service lights or symbols on dashboard display).

A speaker 917 is a device that converts electrical signals into sound. A speaker on a mobile device is used for communications that is relaying the sound of the remote party as RF signals received via the antenna 904, coupled to the RF transmitter/receiver 903 and processed by the processor 901. A speaker may also be used for playing the audio e.g. music that may be stored on the mobile device or may be streaming using internet communications.

A microphone 918 is a device that converts sound signals into electrical signals. A microphone on a mobile device is used for communications by converting the sound of the user to the remote party. Sound signals converted to electrical signals are relayed to the remote party as RF signals received via the antenna 904, coupled to the RF transmitter/receiver 903 and processed by the processor 901. In the present invention, a microphone may be used for audio capture (e.g. sounds of engine running or revving). Microphone may also be used for voice input.

A user interface/keyboard or a touchscreen 919, are among the many different methods for receiving input from a user and converting this input into the appropriate electrical signals to be processed by the processor 901. Most Smartphones these days have a touchscreen that enables a user to touch and provide an input e.g. typing text, or playing a game using gestures. In the present invention, keyboard or touchscreen inputs may be received from a user to complete fields of the form to provide vehicle data.

A ringer/vibrator 920 is used for alerting a user of any incoming or outgoing communications, e.g. an incoming call, an outgoing e-mail.

In one embodiment there may be a database that stores the warranty information for different makes and models of vehicles. Such a database may also store the required service to the vehicle at given intervals or given mileages. Such a database may be hosted on line so that it is accessible over a network e.g. the internet using a connected device e.g. a Smartphone.

Thus using such a database and the mileage information provided by the user or acquired via OCR from a photo of the dashboard of a vehicle it can be determined if a vehicle is under warranty or not. Thus the data capture requirements may vary depending on whether a vehicle is under warranty or not.

In one embodiment prompt the user to take the photos of the instrument panel (dash) of a vehicle to capture any service lights that may have come on suggesting that a user take the vehicle to a dealership for required service like a scheduled oil change or an engine check up.

These descriptions exemplify only some of the several possible embodiments and are not meant to be exhaustive.

It should be understood that although the term application has been used as an example in this disclosure but in essence the term may also imply to any other piece of software code where the embodiments are incorporated. The software application can be implemented in a standalone configuration or in combination with other software programs and is not limited to any particular operating system or programming paradigm described here.

The computer program comprises: a computer usable medium having computer usable program code, the computer usable program code comprises: computer usable program code for presenting graphically to the users options for scrolling via the touch-screen interface.

The examples noted here are only for illustrative purposes and there may be further implementation embodiments possible with a different set of components. While several embodiments are described, there is no intent to limit the disclosure to the embodiment or embodiments disclosed herein. On the contrary, the intent is to cover all practical alternatives, modifications, and equivalents.

What is claimed is:

1. A mobile device comprising:
   a camera;
   a display;
   a memory, the memory configured to store a plurality of vehicle sketch-lines; and
   a processor in communication with the camera, the display, and the memory, the processor configured to:
   access a vehicle identification number related to a vehicle;
   access decoded particulars of the vehicle received responsive to a query of the vehicle identification number in at least one database;

pre-populate a form having a set of fields for entry of vehicle data at least certain fields from the decoded particulars;
responsive to determining to obtain a first image from a first perspective of the vehicle:
automatically select, based on the vehicle identification number and from the plurality of vehicle sketch-lines, a first selected vehicle sketch-line for over-lay, wherein the first selected vehicle sketch-line is for output at a first position on the display and indicative of the first perspective of the vehicle;
access an output of the camera, the output of the camera including image of the vehicle;
determine whether the vehicle in the image is aligned with the first position of the first selected vehicle sketch-line on the display;
output on the display a first over-layed image, the first over-layed image comprising the image of the vehicle with the first selected vehicle sketch-line over-layed on the image of the vehicle and output at the first position on the display;
provide an indication to a user as to whether the image of the vehicle at the first perspective of the vehicle was obtained;
responsive to determining to obtain a second image from a second perspective of the vehicle:
automatically select, based on the vehicle identification number and from the plurality of vehicle sketch-lines, a second selected vehicle sketch-line for over-lay, wherein the second selected vehicle sketch-line is for output at a second position on the display and indicative of the second perspective of the vehicle;
access an output of the camera, the output of the camera including image of the vehicle;
determine whether the vehicle in the image is aligned with the second position of the second selected vehicle sketch-line on the display;
output on the display a second over-layed image, the second over-layed image comprising the image of the vehicle with the second selected vehicle sketch-line over-layed on the image of the vehicle and output at the second position on the display; and
providing an indication to the user as to whether the image of the vehicle at the second perspective of the vehicle was obtained.

2. The mobile device of claim 1, wherein responsive to determining to obtain the first image from the first perspective of the vehicle, the processor is further configured to:
determine a first direction that the camera is to be moved in order to align the vehicle in the image with the first position of the first selected vehicle sketch-line on the display; and
output on the display a first indication of the first direction over-layed on the image of the vehicle,
wherein responsive to determining to obtain the second image from the second perspective of the vehicle, the processor is further configured to:
determine a second direction that the camera is to be moved in order to align the vehicle in the image with the second position of the second selected vehicle sketch-line on the display; and
output on the display a second indication of the second direction over-layed on the image of the vehicle.

3. The mobile device of claim 2, wherein the first indication comprises a first arrow indicative of a moving by the user in the first direction; and
wherein the second indication comprises a second arrow indicative of a moving by the user in the second direction.

4. The mobile device of claim 1, wherein the first selected vehicle sketch-line is the same as the vehicle.

5. The mobile device of claim 1, wherein the first selected vehicle sketch-line is a same type as the vehicle.

6. The mobile device of claim 1, wherein the first selected vehicle sketch-line is of an exterior of the vehicle; and
wherein the second selected vehicle sketch-line is of an interior of the vehicle.

7. The mobile device of claim 6, wherein the second selected vehicle sketch-line is of a dashboard of the vehicle.

8. The mobile device of claim 6, wherein the second selected vehicle sketch-line is of an odometer of the vehicle.

9. The mobile device of claim 1, wherein the first selected vehicle sketch-line comprises an outline of the vehicle and at least one feature of the vehicle, the at least one feature being within the outline of the vehicle.

10. The mobile device of claim 9, wherein the at least one feature comprises a headlight.

11. The mobile device of claim 9, wherein the at least one feature comprises a grille of the vehicle.

12. The mobile device of claim 1, wherein the first selected vehicle sketch-line is of an exterior of the vehicle and the second selected vehicle sketch-line is of a sub-part of the exterior of the vehicle.

13. The mobile device of claim 1, wherein the processor is configured to provide visual cues as to each of front, back, and side of the vehicle to take an image of; and
wherein vehicle sketch-lines are selected for each of the front, back, and side of the vehicle.

14. The mobile device of claim 1, wherein the processor is configured to certify that the image of the vehicle at the first perspective of the vehicle was obtained and the image of the vehicle at the second perspective of the vehicle was obtained.

15. The mobile device of claim 1, wherein the processor is further configured to:
responsive to obtaining the image of the vehicle at the first perspective of the vehicle, prompt the user to provide input as to damage regarding the vehicle.

16. The mobile device of claim 15, wherein the user is prompted to move closer to the vehicle relative to the first perspective of the vehicle in order to provide the input as to the damage regarding the vehicle.

17. A method for a mobile device to capture an image of a vehicle, the method comprising:
accessing, by the mobile device, a vehicle identification number related to the vehicle;
accessing decoded particulars of the vehicle received responsive to a query of the vehicle identification number in at least one database;
pre-populating a form having a set of fields for entry of vehicle data at least certain fields from the decoded particulars;
responsive to determining to obtain a first image from a first perspective of the vehicle:
automatically selecting, based on the vehicle identification number and from a plurality of vehicle sketch-lines, a first selected vehicle sketch-line for over-lay, wherein the first selected vehicle sketch-line is for output at a first position on a display of the mobile device and indicative of the first perspective of the vehicle;

accessing an output of a camera of the mobile device, the output of the camera including image of the vehicle;

determining whether the vehicle in the image is aligned with the first position of the first selected vehicle sketch-line on the display;

outputting on the display a first over-layed image, the first over-layed image comprising the image of the vehicle with the first selected vehicle sketch-line over-layed on the image of the vehicle and output at the first position on the display;

providing an indication to a user as to whether the image of the vehicle at the first perspective of the vehicle was obtained;

responsive to determining to obtain a second image from a second perspective of the vehicle:

automatically selecting, based on the vehicle identification number and from a plurality of vehicle sketch-lines, a second selected vehicle sketch-line for overlay, wherein the second selected vehicle sketch-line is for output at a second position on the display of the mobile device and indicative of the second perspective of the vehicle;

accessing an output of the camera of the mobile device, the output of the camera including image of the vehicle;

determining whether the vehicle in the image is aligned with the second position of the second selected vehicle sketch-line on the display;

outputting on the display a second over-layed image, the second over-layed image comprising the image of the vehicle with the second selected vehicle sketch-line over-layed on the image of the vehicle and output at the second position on the display; and providing an indication to the user as to whether the image of the vehicle at the second perspective of the vehicle was obtained.

18. The method of claim 17, further comprising capturing the vehicle identification number using at least one of a barcode scanner, digital camera, on board diagnostics, or user input.

19. The method of claim 17, responsive to determining to obtain the first image from the first perspective of the vehicle, further comprising:

determining a first direction that the camera is to be moved in order to align the vehicle in the image with the first position of the first selected vehicle sketch-line on the display;

outputting on the display a first indication of the first direction over-layed on the image of the vehicle;

monitoring alignment of the vehicle in the image with the first position of the first selected vehicle sketch-line on the display; and responsive to determining that the vehicle in the image is aligned with the position of the first selected vehicle sketch-line on the display, removing the first indication of the first direction over-layed on the image of the vehicle;

responsive to determining to obtain the second image from the second perspective of the vehicle, further comprising:

determining a second direction that the camera is to be moved in order to align the vehicle in the image with the second position of the second selected vehicle sketch-line on the display; and outputting on the display a second indication of the second direction over-layed on the image of the vehicle.

20. The method of claim 19, wherein the first indication of the first direction comprises an arrow.

21. The method of claim 20, wherein the arrow is indicative of a moving by user in the first direction.

22. The method of claim 17, wherein the first selected vehicle sketch-line is the same as the vehicle.

23. The method of claim 17, wherein the first selected vehicle sketch-line is of an exterior of the vehicle; and wherein the second selected vehicle sketch-line is of an interior of the vehicle.

\* \* \* \* \*